US005555793A

United States Patent [19]

Tocchet et al.

[11] Patent Number: 5,555,793

[45] Date of Patent: Sep. 17, 1996

[54] FOOD VENDING MACHINE PARTICULARLY WARM FOOD SUCH AS TOASTS, SANDWICHES, PIZZAS AND BRIOCHES

[76] Inventors: Ivan Tocchet, Via Pian dei Salesei 18, 31029 Vittorio Veneto (Province of Treviso); Edoardo Scarpis, Via Zanucchi 2, 31014 Colle Umberto (Prov. of Treviso), both of Italy

[21] Appl. No.: 403,782

[22] PCT Filed: Jul. 21, 1994

[86] PCT No.: PCT/EP94/02406

§ 371 Date: Mar. 16, 1995

§ 102(e) Date: Mar. 16, 1995

[87] PCT Pub. No.: WO95/04334

PCT Pub. Date: Feb. 9, 1995

[30] Foreign Application Priority Data

Jul. 27, 1993 [IT] Italy ................................ PN93A0056

[51] Int. Cl.$^6$ ............................ A47J 27/00; A47J 37/00; G07F 9/10

[52] U.S. Cl. ................................ 99/326; 99/355; 99/357; 99/451; 221/150 A

[58] Field of Search ............................ 99/325–330, 357, 99/451, 483, 485, DIG. 14, 352–355; 53/155; 221/150 A, 150 HC, 150 R; 426/523; 219/678, 698, 702, 756

[56] References Cited

U.S. PATENT DOCUMENTS

| | | | |
|---|---|---|---|
| 1,755,699 | 4/1930 | Loehr | 99/355 |
| 1,973,195 | 9/1934 | Ankcorn | 53/155 |
| 3,340,789 | 9/1967 | Simjian | 99/352 |
| 3,984,030 | 10/1976 | Morini | 99/357 |
| 4,008,657 | 2/1977 | Yamamura et al. | 99/483 |
| 4,179,985 | 12/1979 | Baker et al. | 99/339 |
| 5,113,754 | 5/1992 | Robinson et al. | 9/326 |
| 5,168,795 | 12/1992 | Okada | 99/326 |
| 5,172,328 | 12/1992 | Cahlander et al. | 99/325 |
| 5,309,824 | 5/1994 | Dromgoole et al. | 99/326 |
| 5,365,835 | 11/1994 | Naramura | 99/357 |
| 5,400,699 | 3/1995 | Cailbault | 99/357 |

FOREIGN PATENT DOCUMENTS

| | | |
|---|---|---|
| 0337836 | 10/1989 | European Pat. Off. . |
| 570503 | 2/1933 | Germany . |
| 2417505 | 2/1975 | Germany . |

*Primary Examiner*—Timothy F. Simone
*Attorney, Agent, or Firm*—Guido Modiano; Albert Josif

[57] ABSTRACT

Food vending machine particularly for warm food, toasts in the specific case, including multiple per se known stations which are combined so as to obtain a machine which starts from a blister-packaged container inside which a pre-packaged uncooked toast is wrapped and transfers said toast by means of an appropriate drive to a pickup station so that the product to be cooked is placed at a moving cooking station and so that the product is extracted with special extractors after cooking so as to offer it, at the end of the cycle, completely wrapped in an appropriate hygienic napkin for taking on the part of the consumer.

24 Claims, 9 Drawing Sheets

FOOD VENDING MACHINE PARTICULARLY WARM FOOD SUCH AS TOASTS, SANDWICHES, PIZZAS AND BRIOCHES

TECHNICAL FIELD

The present invention relates to a vending machine for warm food such as toasts, sandwiches, pizzas, brioches, et cetera. In the current state of the art there are various kinds of vending machines. The most common ones are those for hot or cold beverages, often associated with vending machines for solid food (brioches, sandwiches, potato chips, etc.) that is invariably cold.

There are also stations for the distribution of toasts, for example, with a built-in oven that however entail manual intervention of the operator to unpackage the product and insert it into the toaster.

As an alternative, by inserting a token, coin or magnetic card in an appropriate collection unit, the machine dispenses an uncooked packaged toast that is collected by the consumer, manually unpackaged, and also manually inserted into the toaster to be then extracted, after various inspections, once cooking is complete, with the risk of burning to one's fingers.

The current process has several drawbacks.

The foremost drawback relates to the hygiene factor, because the toaster is exposed to the public and it is consequently easily subject to the insertion of foreign matter therein.

Accidents are another important drawback, since a child might imprudently insert his hand into the toaster.

Another drawback is the user's involvement for the manual process during the various operation steps, which can sometimes lead to loss of grip on the product.

Still another drawback is the handling of the product, which sometimes occurs with hands that are not perfectly clean and helps to worsen the hygienic situation.

DISCLOSURE OF THE INVENTION

Accordingly, a principal technical aim of the present invention is to provide a vending machine for warm toasts, pizzas, brioches, et cetera that is capable of dispensing products through an appropriately provided slot so that they are partially wrapped in a napkin for holding them and are perfectly as well as uniformly cooked.

An object of the present invention is to provide a vending machine for the above listed products which is obtained from the combination of partially conventional parts which are mutually connected so as to achieve an automatic and reliable productive result.

Another object is to provide a machine which has low manufacturing and running costs so as to avoid excessively affecting the cost of the product to be distributed.

An advantage of the vending machine according to the invention is the provision of electronic management and control systems suitable to provide timely reporting of jammings or failures occurring during the various steps of the process.

Another advantage is that the vending machine has been designed so as to considerably limit electric power consumption without however altering the quality of the dispensed product.

Another object is to achieve perfect cooking of the products in a considerably shorter time than normal toasters, so as to cope with intense demand by providing a high dispensing rate.

Another object is to store the products inside the vending machine so that they are pre-packaged in hermetically sealed containers which ensure that external agents cannot affect the product.

Another object is to ensure perfect preservation of the products even in case of prolonged inactivity of the machine, since they are stored in an appropriate refrigeration chamber.

With this technical aim and the consequent objects in view, there is provided a vending machine for warm food products such as toasts, which is characterized in that it comprises: a first station for storing pre-packaged products in an appropriate refrigeration chamber; a second station for cutting a protective package of the container inside which the product to be processed is present; arranged for receiving the product from the second station and being a pickup station formed by a gripper which is contrasted by springs and is such as to keep the product firmly clamped inside it; a device for rotating gripper about one of its axes through 90°, so as to arrange the gripper vertically with respect to the loading position of the gripper a vertically movable cooking station capable of descending for cooking and lifting once cooking is complete; a device for extracting the processed product; a device for feeding a strip of napkins arranged along a perpendicular axis such that the product is wrapped in the napkins before it appears at the dispensing slot for hygienic taking on the part of the consumer; and electronic controllers suitable to interrupt the production cycle in the presence of abnormal conditions.

BRIEF DESCRIPTION OF THE DRAWINGS

Further characteristics and advantages of the invention will become apparent from the following detailed description of a preferred embodiment thereof, illustrated only by way of non-limitative example in the accompanying drawings, wherein.

WAYS OF CARRYING OUT THE INVENTION

Figure 1:
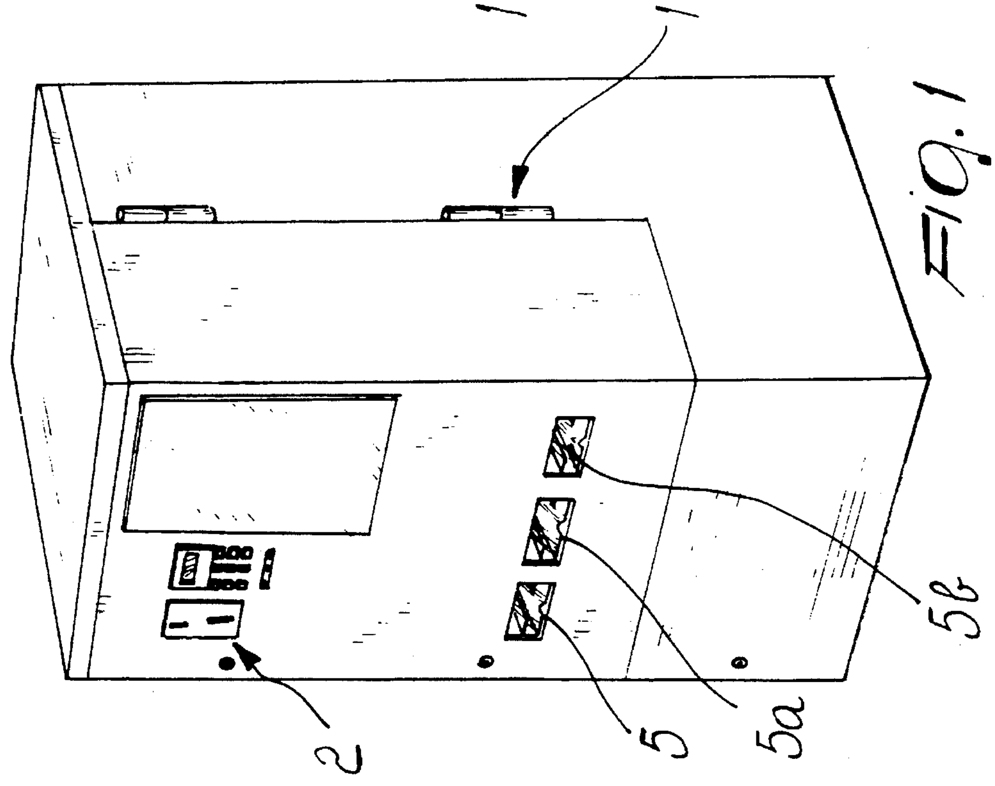
FIG. 1 is a general perspective view of the vending machine, illustrating the payment collection unit, the indication and monitoring lights, and the slot for dispensing or picking up the cooked product.

With reference to FIG. 1, the reference numeral 1 generally designates the box-like structure of the vending machine, which is substantially externally provided with an appropriate and conventional coin insertion device 2 completed with a related apparatus for returning coins in case of non-use. The reference numeral 3 designates a readout apparatus constituted by a display which provides the sum of the value of the inserted coins and is associated with a series of indicator lights 4.

Accordingly, the user, after inserting the coins into the appropriate slot, sees the sum of said coins appear on the lighted display 3 until the amount preset by the sales operator is reached. At this point one of the indicator lights of the set designated by the reference numeral 4 blinks to indicate that the machine can be started for the dispensing of a warm toast.

In the lower part of the external structure of the vending machine, designated by the reference numeral 5, there are slots 5–5*a*–5*b* to allow the user to pick up the cooked product, which is a toast in the case being described but can in any case be replaced with similar food such as pizzas, sandwiches or brioches which are always and in any case cooked or warm.

Figure 4:
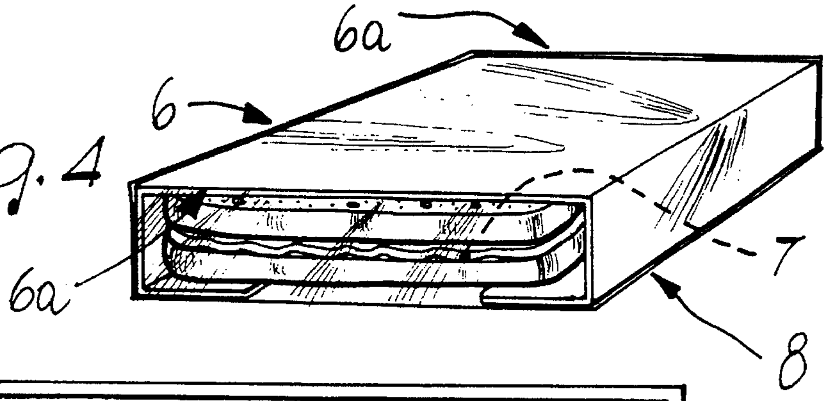
FIG. 4 is a perspective view of the toast carrying container with heat-shrinking protection.

In FIG. 4 the reference numeral 6 generally designates a substantially C-shaped metal container wherein a pre-packaged toast 7 has been inserted manually; the entire unit, i.e. the metal container 6 and the toast 7, are further wrapped in a non-toxic heat-shrinking plastic material 8 which is in any case such as to preserve the product contained therein.

Said container 6 and many other identical ones are manually inserted along appropriate guides 9 so as to form a complete stack of containers which are stacked one above the other.

Figure 2:
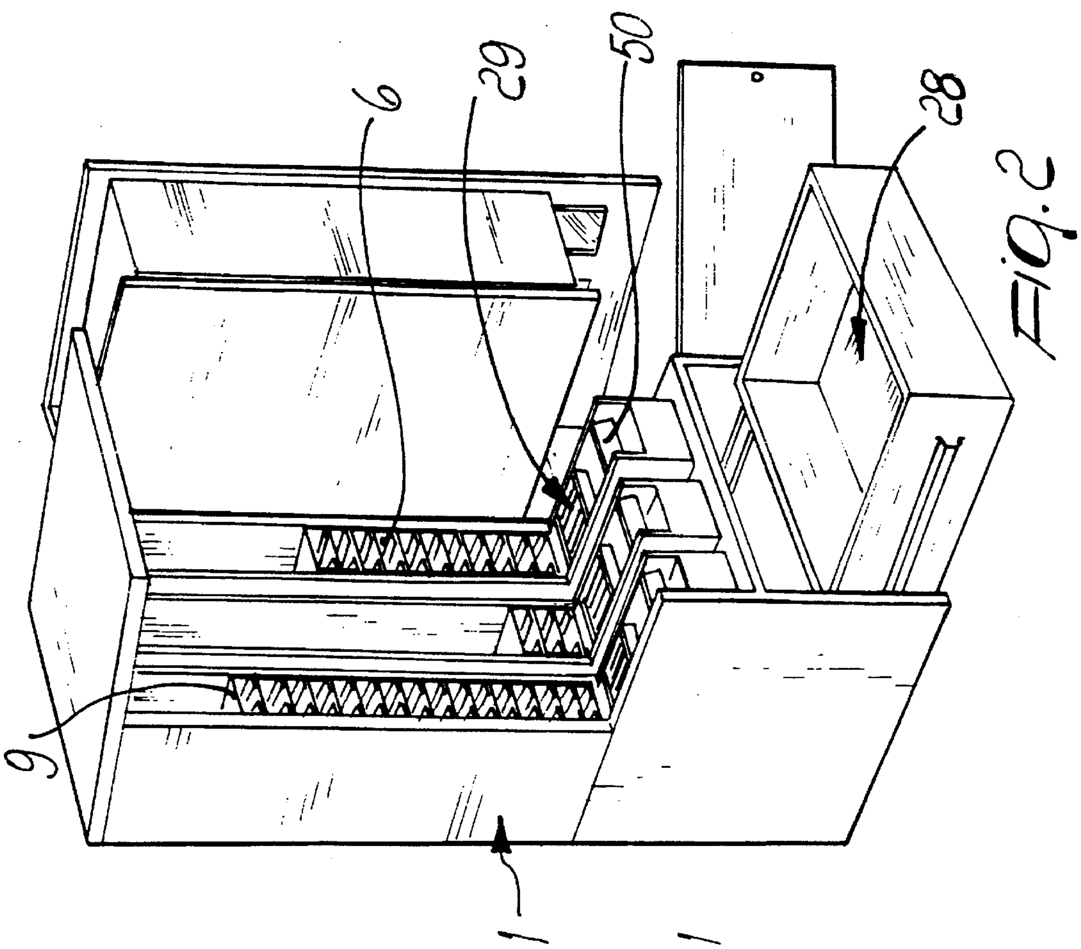
FIG. 2 is a perspective view of the vending machine in open position for the loading of the product to be dispensed, and of a drawer-like compartment for collecting the empty containers and the waste product.

Only one central stack is shown in FIG. 2. In the practical use of the vending machine according to the invention there are three or more sets arranged side by side so that they can all be loaded with the same product or each one with different products for each stack.

Figure 5:
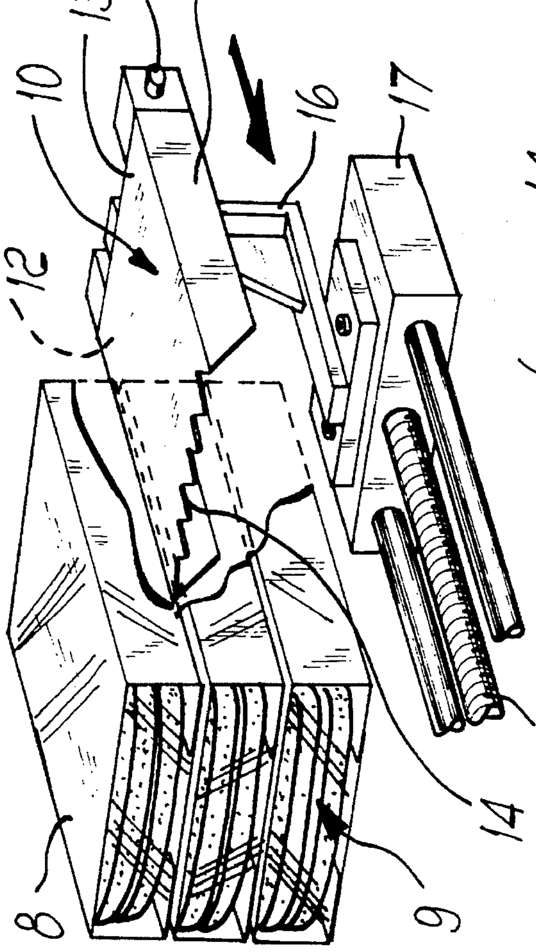
FIG. 5 is a perspective view of the cutting station.
Figure 6:
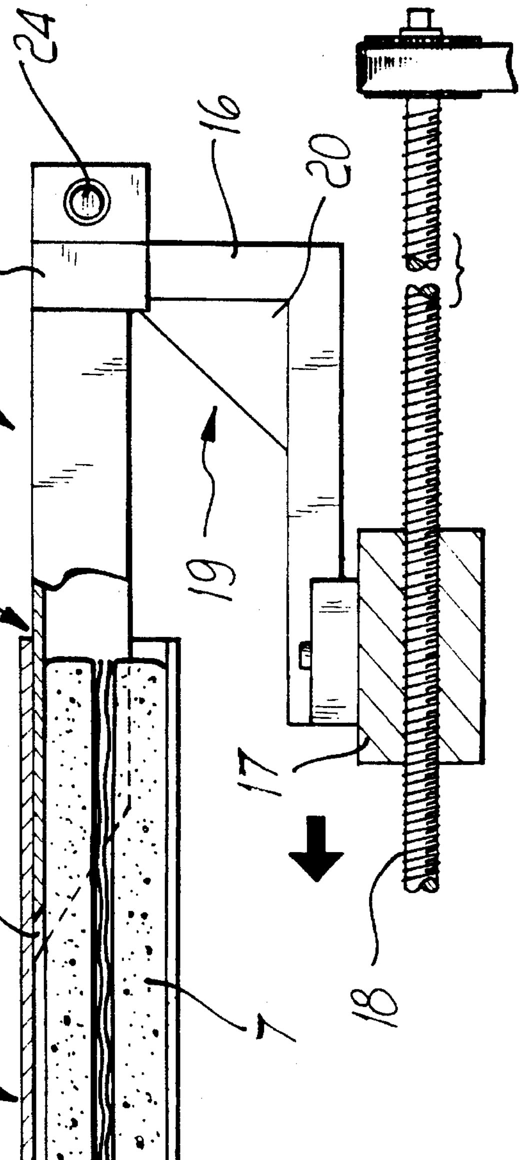
FIG. 6 is a transverse sectional view of the cutting station.

Then, when the user presses the button to start the machine, the device shown in FIG. 5, more specifically a station for cutting and extracting the toast from its container, starts to operate.

The reference numeral 10 in fact designates an appropriate C-shaped device which has two lateral wings 11 and 12 which are frontally inclined, have a sharp edge, and are joined to a flat face 13 which is frontally provided with a sharp serration 14.

Said cutting device 10 has on its trailing edge, in any case in a position which is opposite to the cutting blade 14, a rigid cross-member 15, acting as a pusher, with which a shaped arm 16 is associated and forms an integral part thereof; said arm is connected to a threaded transmission shaft 18 by means of a support 17.

Said shaped arm 16 has another cutting element with a blade 20 in the position 19.

Figure 7A:
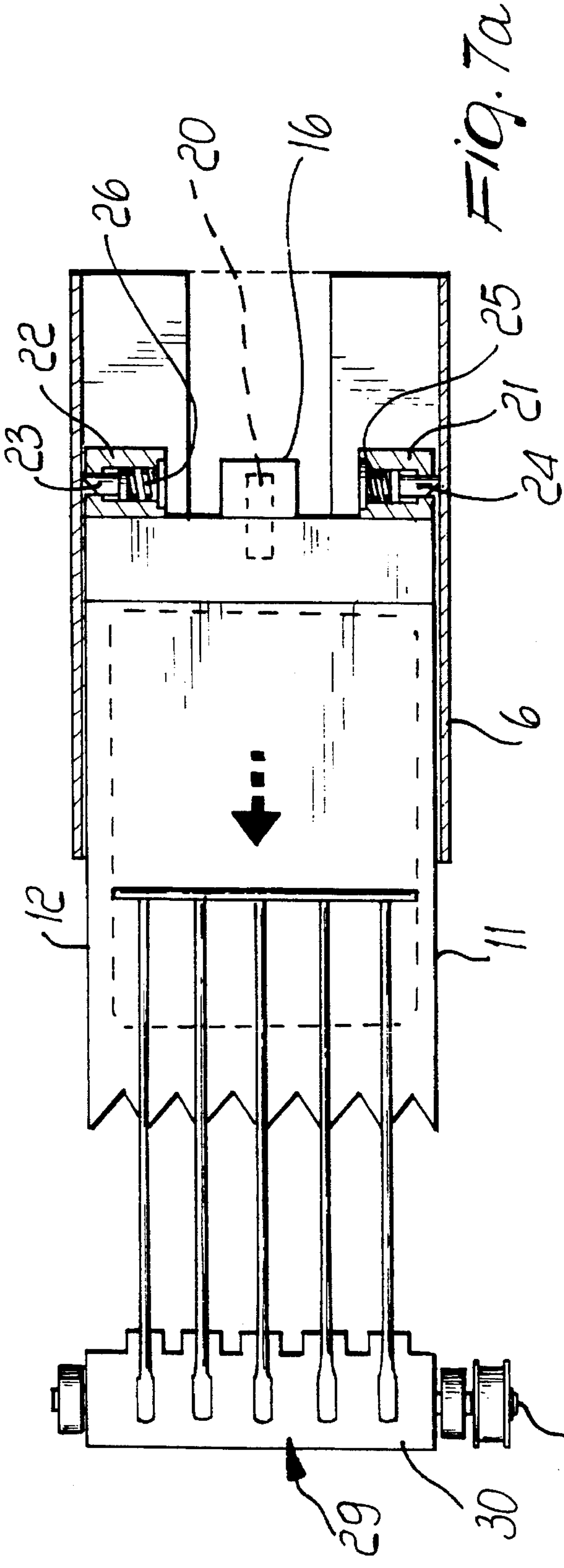
FIGS. 7*a* and 7*b* are sectional views of the machine showing the steps for cutting the heat-shrinking package, for extracting the toast which is pushed onto the gripper, and for removing the toast carrying container from the loading stack.

The reference numerals 21 and 22 designate two further metal blocks which are shown in FIG. 7*a* and have retracting pins 23 and 24 which are contrasted by springs 25 and 26.

Accordingly, the cutting station constituted by the device designated by the reference numeral 10 advances horizontally on a motorized shaft 18 due to its engagement by the support 17. This advancement causes the serrated edge 14 to cut the heat-shrinking package in the upper part of the container 6*a* of the toast and, as the cutting device 10 continues to advance, said heat-shrinking material is cut in the lower part of the container by means of the blade 20 associated with the arm 16.

During the advancement of the C-shaped cutting device 10, the cross-member 15 associated therewith makes contact with the toast 7 and pushes it so as to release it from the metal container 6.

The cutting device 10 inside the toast carrying container 6 continues to advance until it passes beyond the metal container 6 so as to release the two retracting devices 23 and 24 which are contrasted by the springs 25 and 26.

Figure 7B:
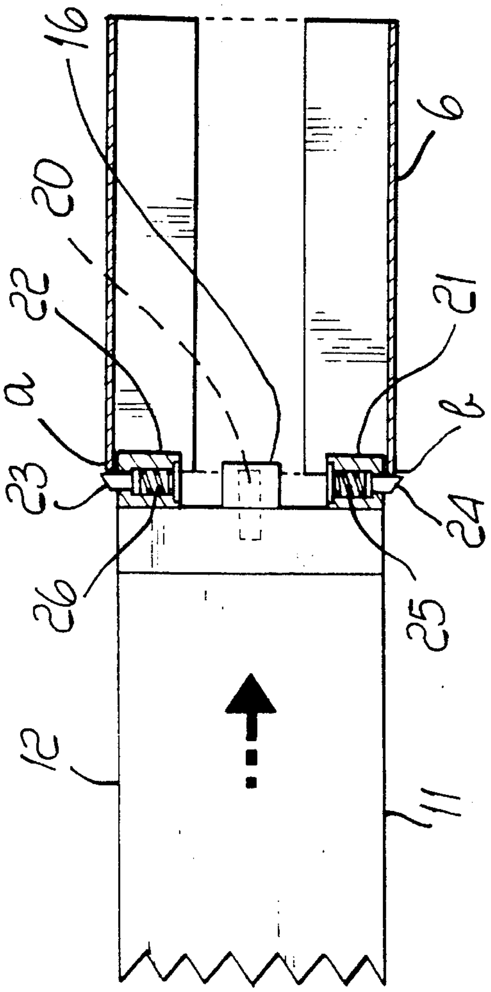
Figure 8:
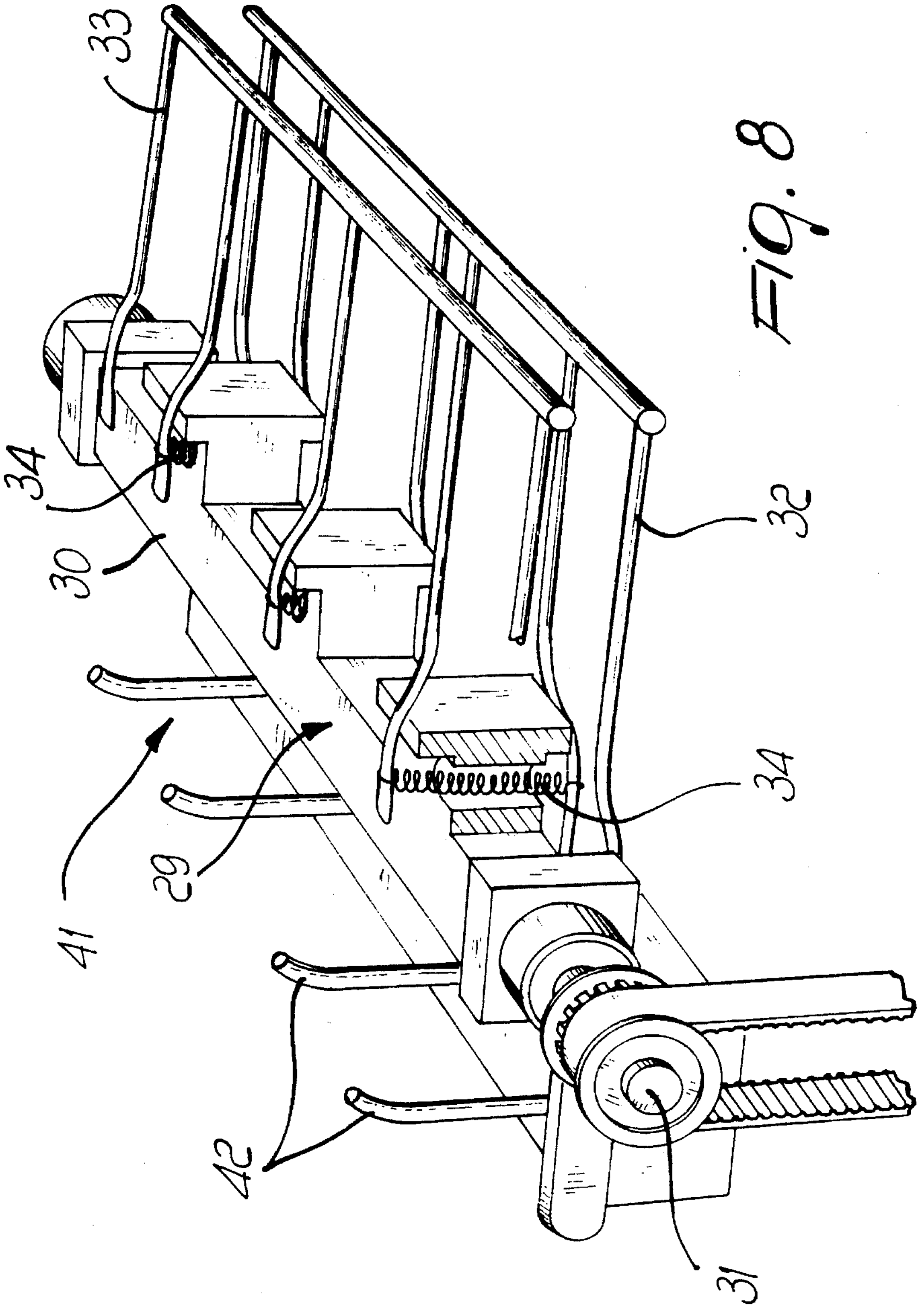
FIG. 8 is a perspective view of the toast supporting gripper and of the set of combs for pushing the cooked toast towards the outlet.

As shown in FIG. 7*b*, said two devices, constituted by two cylindrical pins with a chamfered front edge, by engaging the points "a" and "b" of the vertical wings 11 and 12 of the cutting device during the return stroke, move the metal container, disengaging it from the loading row 9. Said container, due to the lack of further supporting guides, drops onto an appropriate conveyor belt 27 which is automatically actuated by a limit switch of the cutting station and conveys the container 6 and the heat-shrinking protection into a collection drawer 28. The container will subsequently be removed and, in another place, washed, sterilized, refilled with a new product, blister-packaged and returned to the cycle. During the advancement step, the product 7 is pushed by the cross-member 15 which belongs to the cutting device into the subsequent pickup station 29.

Said pickup station 29 is constituted by a horizontal support 30 which can rotate freely about its motorized shaft 31. The movement of said station is of the stepwise type: in other words, to cover a 180° angle during the active step it interrupts its motion at 90° for a preset time, described hereinafter, whereas in the passive or return step it covers 180° in a single sequence.

Two series of toast carrying arms 32 and 33 are associated on said shaft 31 and are contrasted by springs 34 which apply tension so as to grip the toast 7 interposed between the arms. In any case, in order to facilitate the insertion of the toast 7 into the pickup station 29 there are devices that keep the two arms 32 and 33 .slightly spaced. Similar devices allow easy disengagement of the arms for the subsequent station for extracting the cooked toast.

Figure 12:
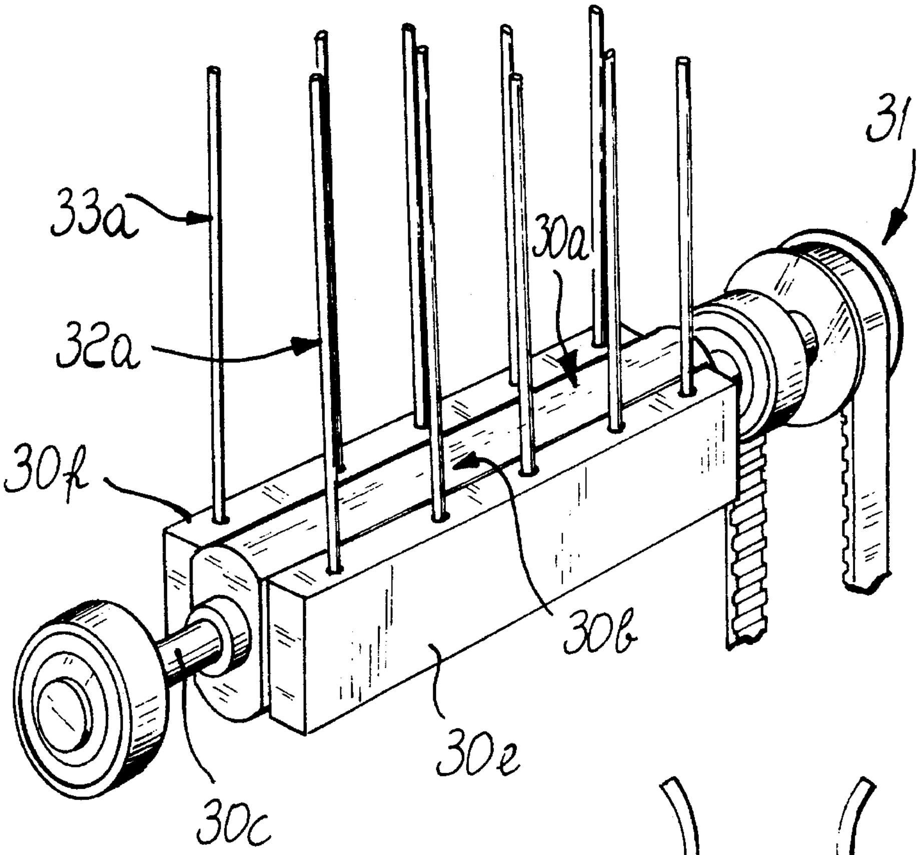
FIG. 12 is a perspective view of a structural variation related to the actuation of the toast carrying gripper.
Figure 13:
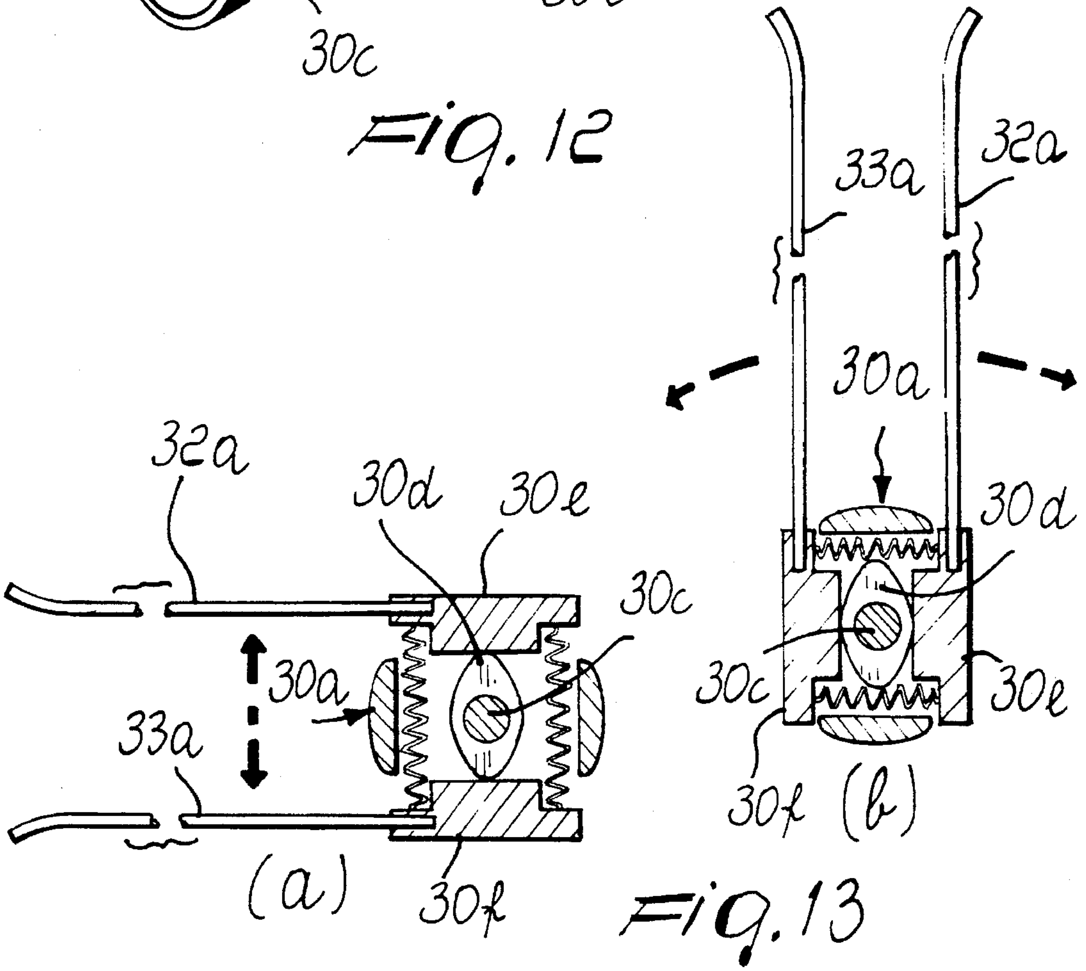
FIGS. 13*a* and 13*b* are sectional views of the toast carrying gripper, illustrating the movement of the cams actuating the toast carrying gripper.

In an alternative embodiment of the pickup station shown in FIGS. 12 and 13, and in order to improve the grip of the product, the horizontal support 30 has been replaced with a different support, generally designated by the reference numeral 30*a*, which comprises a central core 30*b*. Said central core is mounted coaxially with respect to a shaft 30*c* which can rotate freely and is rigidly associated with the structure of the machine.

Two or more cams, designated by the reference numeral 30*d*, are present on said shaft 30C. The movement of the core 30*b* due to the drive 31 interferes with the cams 30*d* so as to move outwardly a pair of blades 30*e* and 30*f* which support arms 32*a* and 33*a*.

The return of said blades 30*e* and 30*f* is obtained by means of one or more pairs of contrast springs which keep the product firmly secured once the cams 30*d* have been disengaged.

Said station works as follows: in the horizontal positions, the cams 30*d* push the arm supporting blades 30*e* and 30*f* so as to move them mutually apart parallel to each other in order to facilitate the insertion and extraction of the product.

In the vertical position said blades, by disengaging from the cams 30*d*, due to the contrast springs, cause the parallel closing of the toast supporting arms, thus obtaining perfect adhesion between the gripper and the product inserted therein during cooking.

Figure 9:
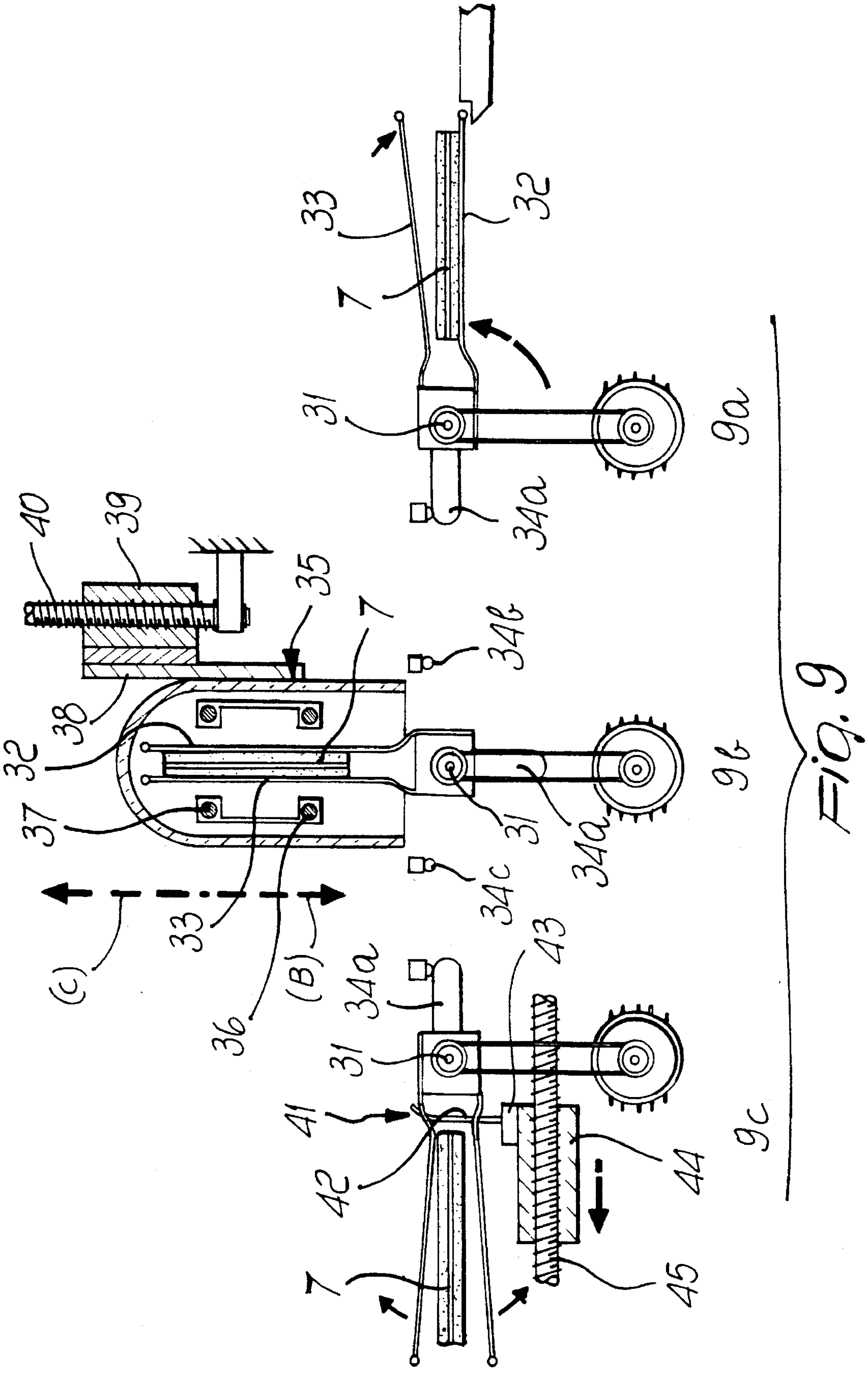
FIG. 9 illustrates, in a continuous sequence: the loading of the toast onto the gripper, the cooking of the toast, and the pushing of the cooked toast towards the outlet by means of the combs.
Figure 10:
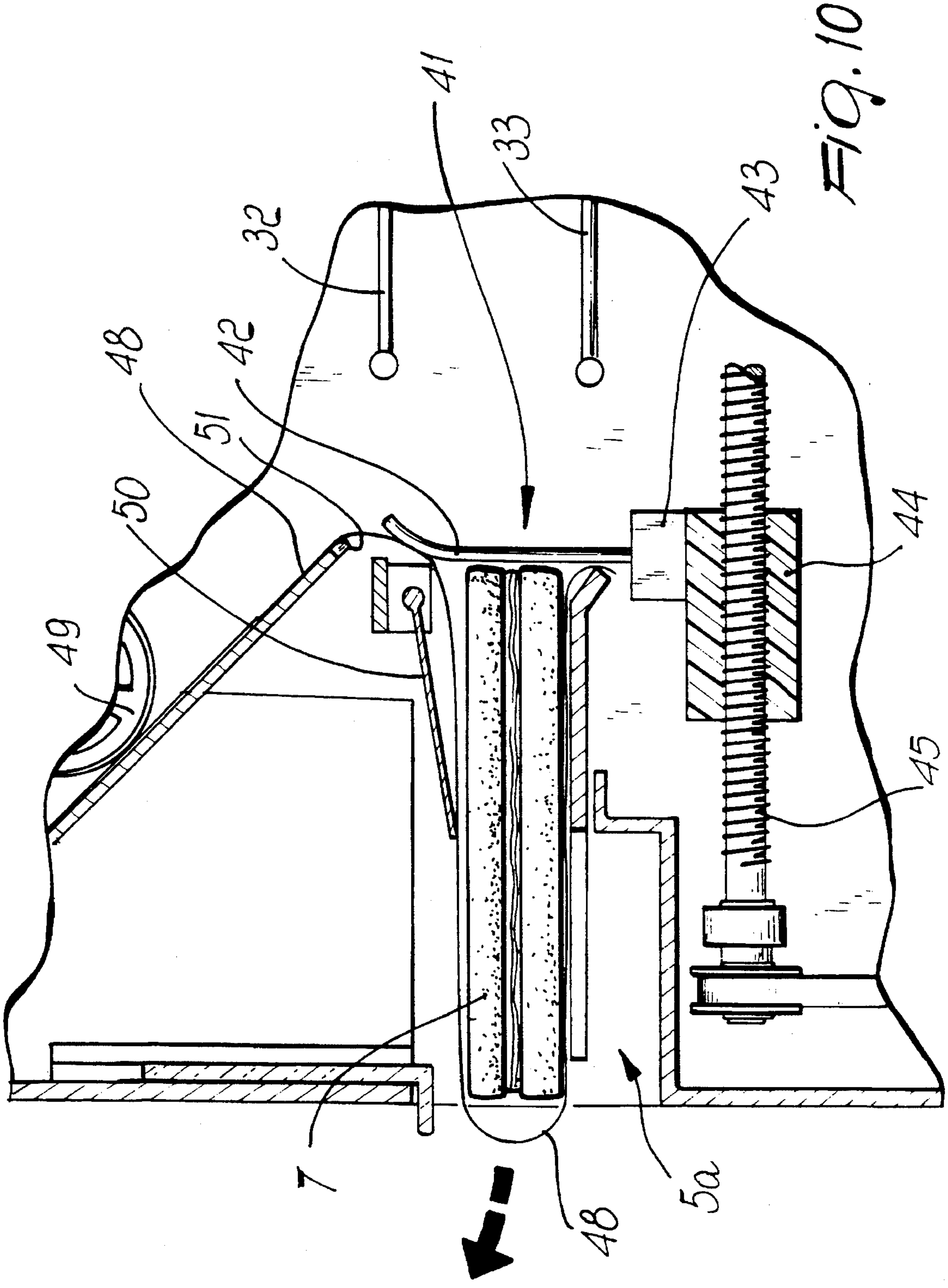
FIG. 10 is a sectional view of the part of the vending machine where the toast is partially wrapped with napkin-like paper.

The drive causes movement from the horizontal position of the pickup station 29, as referenced by 9*a* in FIG. 9, to the vertical position 9*b*. The reference numerals 34*a*, 34*b*, 34*c* designate three per se known inductive sensors which are suitable to block the rotary motion of the product carrying gripper.

The cooking station, designated by the reference numeral 35, starts to operate in the position 9*b*. Said station is constituted by an oven with electric resistors 36 and 37, which is fixed on a support 38, and is associated by means of a threaded bush 39 with a motorized pivot 40.

The movement of said cooking station is vertical, first downward, in the direction designated by the arrow B of FIG. 9, and then, after cooking, in the direction indicated by the upward arrow C. Said cooking station, as already described, has some structural solutions, the first whereof is the preheating of the oven from the moment when the machine is started until the optimum temperature is reached, in which the optimum temperature is kept constant until the end of the cooking step.

The cooking step occurs with a diversified power supply to the electric resistors.

This solution causes the heat to spread from the outside to the inside of the product uniformly by convection without causing the overcooking of the outer parts with respect to the inner ones (caused by the action of the infrared rays).

Once the cooking of the product has been completed, lasting a few minutes, the oven 35 switches off and disengages from the pickup station 29, to return to the initial position, by means of electronically controlled devices.

Due to the action of the motorized shaft 31, the gripper performs the last quarter turn, arranging itself horizontally as referenced by 9*c*, opposite the loading position 9*a*. The reference numeral 41 designates a set of extraction combs which is constituted by a plurality of vertical pins 42 appropriately shaped and associated with a single support 43 which is joined to a slider provided with a threaded bush 44 that is coaxial to a motorized threaded bar 45.

Said set of combs 41 is interposed between the toast 7 and the motorized shaft 31 supporting the gripper parts 32 and 33; accordingly, the advancement of said set of combs 41, due to the action of the motorized shaft 45, causes the movement of the toast towards the outlet and the consequent disengagement of the gripper parts 32 and 33.

Figure 11:
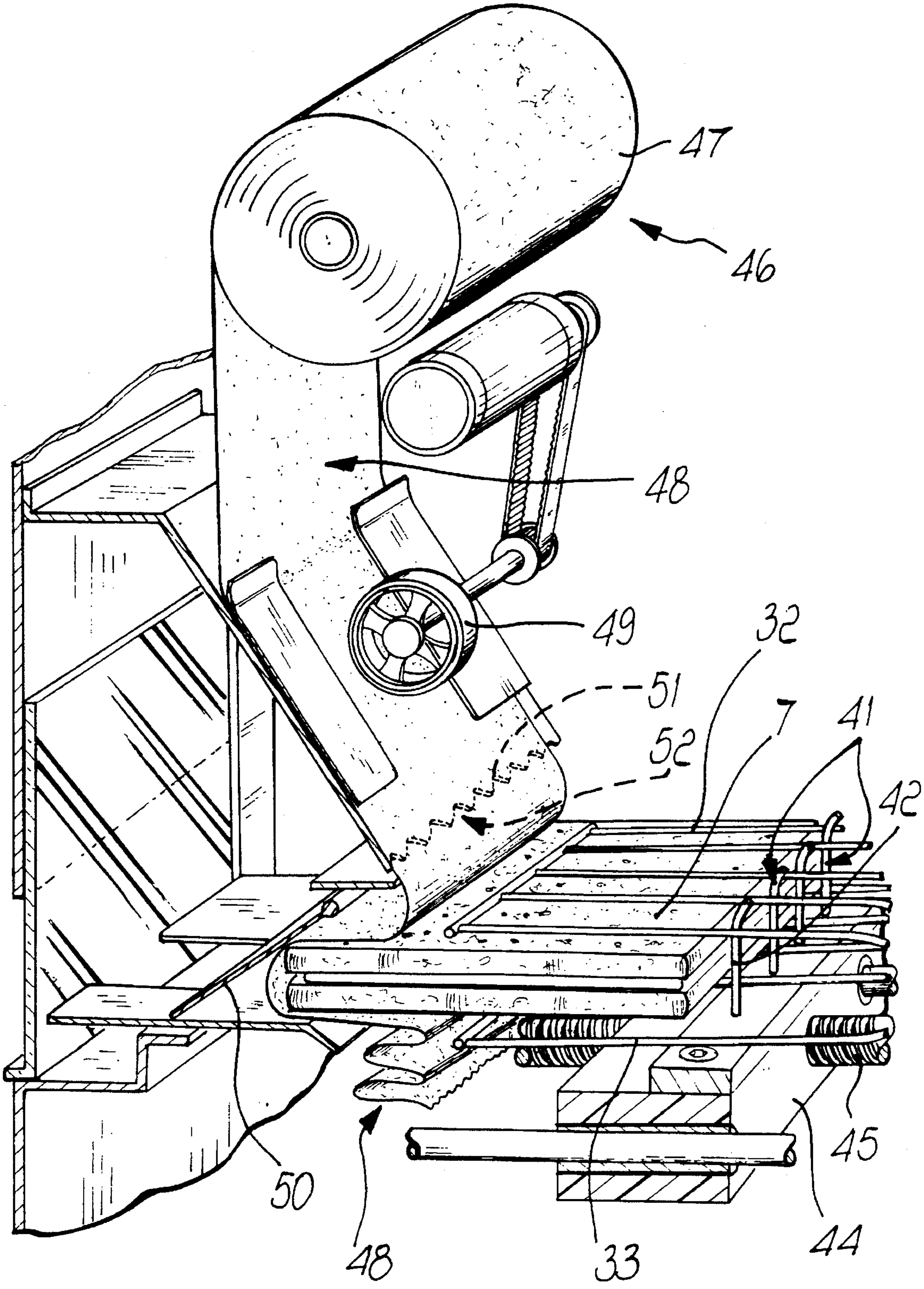
FIG. 11 is a transverse sectional view of the station for feeding the napkin and for dispensing the partially wrapped toast.

FIG. 11 more clearly illustrates this step of operation. The thrust of the combs 41 on the toast 7 causes its horizontal advancement. During this step the toast is partially wrapped by means of napkin-like paper which is automatically dispensed by a feeder designated by the reference numeral 46.

Said feeder is constituted by a paper reel 47 mounted on a freely rotatable shaft.

The paper strip, designated by the reference numeral 48, is caused to advance by a motorized wheel 49. Before the toast arrives, an electronic control device causes the paper dispensing station to dispense an amount of paper that is arranged at right angles to the advancement direction of the toast. Accordingly, during the first part of its advancement the toast is partially wrapped by said paper strip, and the continuous advancement of the toast causes said paper dispensing station to dispense more paper until it allows the complete wrapping of the toast.

The reference numeral 50 designates a flap that moves in a single direction and is raised by the already-cooked product in its advancement towards the slot 5*a*, ready to be taken by the consumer. The pulling action performed on the toast by the consumer tears the napkin strip; this tearing is facilitated by an inclined blade 51 having a serrated edge 52. The extraction of the toast from the gripper makes the comb return to its initial position.

Said position activates the return rotation through 180° of the product carrying gripper in a single sequence.

At the beginning of each production cycle the paper dispensing station distributes the preset amount of paper, which is arranged itself at right angles to the direction of the toast to be dispensed.

Figure 3:
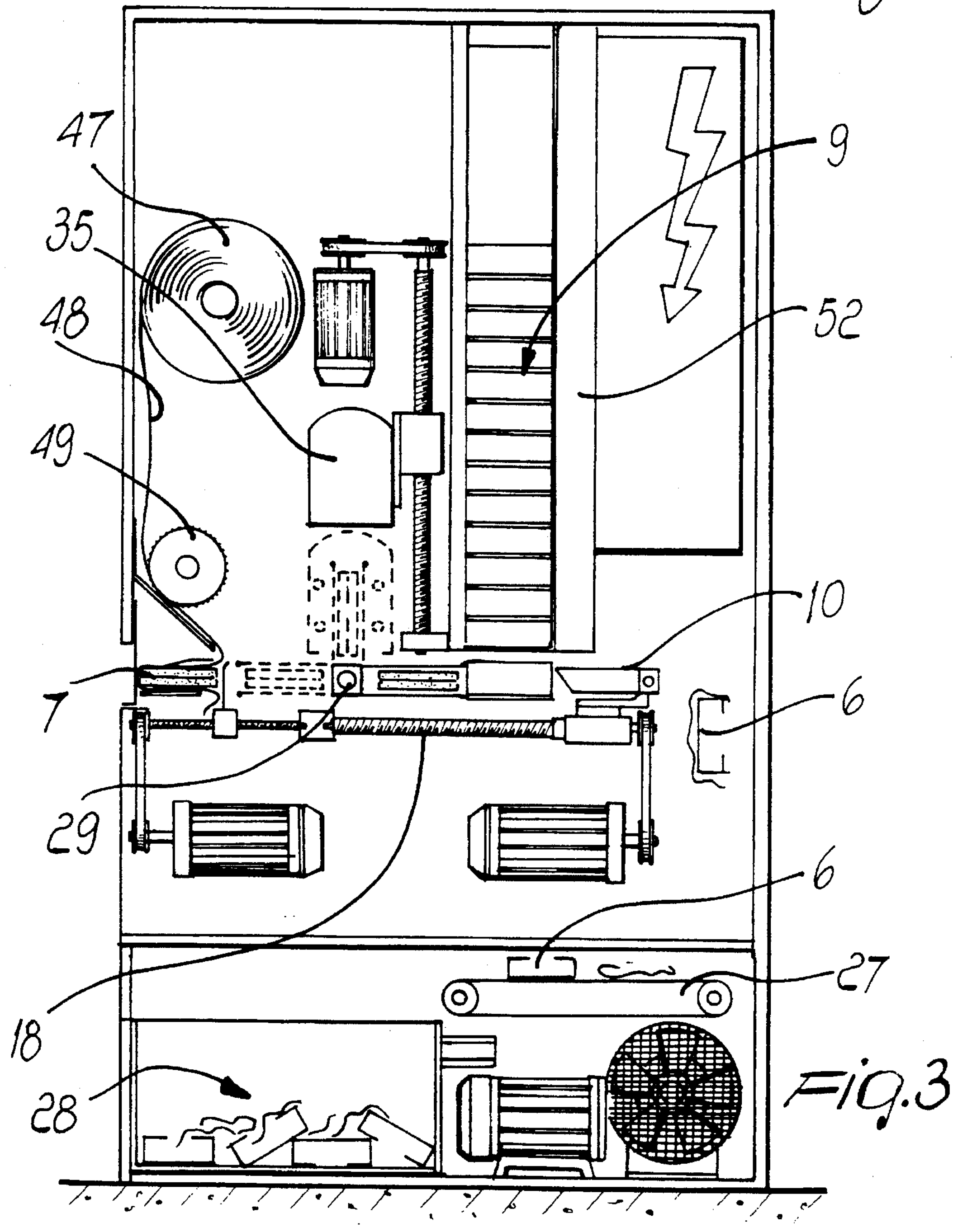
FIG. 3 is a sectional view of the entire vending machine taken along a vertical axial plane.

Finally, it should be noted that there is an appropriate refrigeration unit, generally designated by the reference numeral 52 in FIG. 3, which is provided substantially to ensure the preservation of the uncooked product in case of prolonged inactivity of the vending machine.

The intended and above specified aim and objects have therefore all been achieved, the foremost being the provision of a vending machine for dispensing cooked toasts that operates perfectly.

Another advantage achieved is that the disengagement of a pre-packaged toast from a container that is blister-packaged with heat-shrinking material has been obtained without however bringing any trace of the package into the cooking cycle.

Another advantage achieved is the uniform cooking of the toast throughout by using an appropriate oven so as to achieve optimum cooking.

Another advantage obtained is the complete wrapping of the toast with napkin-type paper so as to avoid direct contact with the user's hands. The final advantage that is obtained is the provision of a vending machine having simple mechanical parts that can be easily inspected both for cleaning and for the loading step. Variations may be necessary during the practical execution of the invention. The materials employed, as well as the dimensions, may be any according to the requirements.

We claim:

1. Vending machine for warm food products such as toasts, comprising: a first station for storing pre-packaged products in an appropriate refrigeration chamber; a second station for cutting a protective package of a container inside which the product to be processed is present; a pickup station arranged for receiving the product from the second station, said pickup station being formed by a gripper which is contrasted by springs and is such as to keep the product firmly clamped inside the gripper; a device for rotating said gripper about an axis of the gripper through 90° so as to arrange the gripper vertically with respect to a loading position; a vertically movable cooking station for receiving the product and capable of descending with the product for cooking and lifting once cooking of the product is complete; a device for extracting the processed product capable of having the gripper inserted therein once the gripper has been rotated another 90° by said device for rotating the gripper and capable of being moved in an advancement direction; a paper feeder device for feeding a strip of napkins arranged along a perpendicular axis, the paper feeding device being arranged such that upon advancement of said device for extracting in the advancement direction the product is wrapped in said napkins before it appears at a dispensing slot for hygienic taking by a consumer; and electronic control means for interrupting a production cycle in the presence of abnormal conditions.

2. Automatic vending machine according to claim 1, wherein said first station comprises one or more box-like columns having a moving front face which is associated with a body of the vending machine, said columns being perimetrically insulated for keeping the product loaded therein at a temperature slightly above zero degrees by virtue of a conventional refrigeration unit.

3. Vending machine according to claim 2, wherein a C-shaped container made of stainless steel is manually insertable in said columns and is capable of containing an uncooked prepackaged toast, said container being capable of being entirely wrapped by a conventional heat-shrinking plastic film in order to protect and isolate the product, together with the related container, from germs, said container being reusable after appropriate washing and sterilization.

4. Vending machine according to claim 3, wherein said C-shaped container is made of an appropriate plastic material a selected one of a non-toxic type and of a low-cost materials type for thus obtaining a throwaway container.

5. Vending machine according to claim 3, wherein said second station comprises a C-shaped moving cutting apparatus with inclined vertical wings and a flat face with a front part having serrations, said cutting apparatus being shaped substantially complementarily with respect to the container of the uncooked toast and being such as to pass through the container internally.

6. Vending machine according to claim 5, wherein said cutting apparatus is associated, at an end opposite to the serrations, with a cross-member which is rigidly coupled to an arm arranged vertically and angularly associated with a perforated support which engages on an appropriate threaded motorized shaft having a motion such as to cause said cutting apparatus to advance.

7. Vending machine according to claim 6, wherein a cutting of the heat-shrinking package is performed simultaneously on three sides of the container including a lower cutting action achieved by a blade which is associated with said arm, is arranged vertically, and is angularly associated with said perforated support.

8. Vending machine according to claim 6, wherein two tabs are present on said cross-member, two extractor pins, contrasted by springs, interacting within said tabs, said pins being such as to be retained within seats of the pins throughout a crossing of the container, whereas, once said pins have been pushed out of said seats under an action of the springs, said pins act as grip means for disengaging the container during a return movement of the cutting apparatus to a starting position.

9. Vending machine according to claim 6, wherein during the advancement of the moving cutting apparatus said cross-member pushes an uncooked toast towards the gripper-equipped pickup station.

10. Vending machine according to claim 7, wherein said container disengages from the loading stack, due to the retraction of the cutting apparatus so as to fall at an end of a stroke of the cutting apparatus onto an underlying conveyor belt for conveying containers into an appropriate drawer together with cut heat-shrinking packages.

11. Vending machine according to claim 1, wherein said pickup station comprises a motorized shaft from which two gripper parts extend, said gripper parts being constituted by multiple metallic arms so as to form a monolithic structure for supporting and gripping the product.

12. Vending machine according to claim 11, wherein a series of contrast springs with ends is present on said motorized shaft, said arms being associated at the ends of said springs, said springs being able to contrast said gripper-like arms with a pulling action, securing the product during a cooking step.

13. Vending machine according to claim 1, wherein said pickup station, by rotating through 90° with respect to a loading step position so as to be arranged vertically, interferes with the cooking station.

14. Vending machine according to claim 13, wherein said cooking station is formed by a box-like oven with an open base inside which there are resistors, said oven being motorized with a descending motion and being such as to entirely surround the gripper, thereby subjecting the product to an irradiation of said resistors for cooking the product.

15. Vending machine according to claim 14, wherein cooking occurs by intermittently supplying power to the resistors by means of an electronic control in order to avoid heavily irradiating an outer surface of the product without affecting an inner portion of the product, thus obtaining uniform cooking in a short time.

16. Vending machine according to claim 1, wherein said gripper containing a cooked product is capable of performing a subsequent quarter turn so as to be arranged horizontally for product extraction, which is obtained by interposing, between the product and a motorized shaft of the gripper, a series of vertical combs being associated with a motorized support associated with said motorized shaft.

17. Vending machine according to claim 16, wherein said vertical combs are adapted for pushing the product towards an outer taking slot and such that the product makes contact, at right angles to an advancement motion of the product, with a vertical strip of paper to partially wrap the product.

18. Vending machine according to claim 17, wherein a distribution of the strip of paper occurs by dispensing a certain amount of paper by means of an appropriate drive and is arranged at right angles to the advancement motion, whereas a final dispensing of a part of paper meant to wrap the product completely occurs when said product advances towards a grip outlet.

19. Vending machine according to claim 18, wherein a first part of the strip of paper is dispensed under supervision of a time-based electric control when said cutting station starts in motion.

20. Vending machine according to claim 1, wherein once the product has been discharged, the gripper returns to an initial position by covering an angle of 180° in a single sequence so as to be arranged in a loading position for the next product.

21. Vending machine according to claim 1, wherein the product that exits towards a taking outlet activates an opening of a flap rotatable about an axis, said flap being rotatable outward only in one direction such as to resume an original position and close the taking outlet once the product has been extracted.

22. Vending machine according to claim 21, wherein said flap movable in a single direction acts as a safety system by preventing an insertion of a user's hands towards moving parts of the machine.

23. Vending machine according to claim 1, wherein supervision of movements of each individual station occurs by means of an electronic system which is controlled by a microprocessor so as to stop any movement in the presence of abnormal conditions.

24. Vending machine according to claim 1, wherein closing and opening of the gripper is achieved by means of a shaft provided with cams, said cams actuating two horizontal arm supporting blades such as to cause a parallel movement of arms supported by said blades.

* * * * *